United States Patent
Muraki

(10) Patent No.: US 7,760,967 B2
(45) Date of Patent: Jul. 20, 2010

(54) IMAGE PROCESSING APPARATUS CAPABLE OF CARRYING OUT MAGNIFICATION CHANGE PROCESS OF IMAGE

(75) Inventor: Jun Muraki, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1044 days.

(21) Appl. No.: 11/265,465

(22) Filed: Nov. 2, 2005

(65) Prior Publication Data
US 2006/0098898 A1 May 11, 2006

(30) Foreign Application Priority Data
Nov. 5, 2004 (JP) ............................. 2004-321421

(51) Int. Cl.
G06K 9/32 (2006.01)
H04N 5/262 (2006.01)
(52) U.S. Cl. ................. 382/298; 382/299; 348/240.99; 348/240.2
(58) Field of Classification Search ................. 382/232, 382/298–300; 348/240.2, 240.99
See application file for complete search history.

(56) References Cited

U.S. PATENT DOCUMENTS

| | | | | |
|---|---|---|---|---|
| 5,164,831 A | * | 11/1992 | Kuchta et al. | 348/231.7 |
| 5,589,850 A | * | 12/1996 | Lin et al. | 345/569 |
| 5,592,187 A | * | 1/1997 | Zenda | 345/3.2 |
| 5,701,138 A | | 12/1997 | Othmer et al. | |
| 5,790,714 A | | 8/1998 | McNeil et al. | |
| 5,872,874 A | | 2/1999 | Natarajan | |
| 6,067,384 A | | 5/2000 | Manickam et al. | |
| 6,249,617 B1 | * | 6/2001 | Chen | 382/298 |
| 6,618,082 B1 | * | 9/2003 | Hayashi et al. | 348/231.99 |
| 6,810,155 B1 | | 10/2004 | Ting et al. | |
| 6,903,733 B1 | * | 6/2005 | Greenberg et al. | 345/204 |

(Continued)

FOREIGN PATENT DOCUMENTS

EP 0 710 925 A2 5/1996

(Continued)

OTHER PUBLICATIONS

Chihoub A., et al., "A Band Processing Imaging Library for a TriCore-Based Digital Still Camera" Real-Time Imaging, Academic Press Limited, GB, vol. 7, No. 4, Aug. 2001, pp. 327-337, XP001124987 ISN: 1077-2014.

(Continued)

Primary Examiner—Wenpeng Chen
Assistant Examiner—Gandhi Thirugnanam
(74) Attorney, Agent, or Firm—Frishauf, Holtz, Goodman & Chick, P.C.

(57) ABSTRACT

When a first DMA unit and a second DMA unit transfer image data in a memory to be divided into units composed of a plurality of lines, a transfer number of lines for an enlargement section is controlled for each unit on the basis of a magnification of an image which has been set. Even if any magnification is set, the number of output lines of a second reduction section can always be made coincident with a number of lines specified in a JPEG encoder. In addition, there is no need for providing an additional circuit configuration such as a buffer memory in the second reduction section in order to match number of lines each other.

18 Claims, 16 Drawing Sheets

U.S. PATENT DOCUMENTS

| | | | |
|---|---|---|---|
| 6,914,699 B1 * | 7/2005 | Takata et al. | 358/1.9 |
| 2003/0007082 A1 * | 1/2003 | Watanabe | 348/273 |
| 2004/0201863 A1 * | 10/2004 | Bailey et al. | 358/1.2 |
| 2004/0223058 A1 * | 11/2004 | Richter et al. | 348/207.1 |
| 2006/0098898 A1 * | 5/2006 | Muraki | 382/299 |

FOREIGN PATENT DOCUMENTS

| | | | |
|---|---|---|---|
| EP | 1 174 823 A2 | | 1/2002 |
| JP | 5-89238 A | | 4/1993 |
| JP | 2002-77803 A | | 3/2002 |
| JP | 2003-18610 A | | 1/2003 |
| JP | 2005-6052 A | | 1/2005 |
| JP | 2005006052 A | * | 1/2005 |
| TW | 416231 | | 12/2000 |
| TW | 510999 | | 11/2002 |
| WO | WO 94/27239 A1 | | 11/1994 |

OTHER PUBLICATIONS

Chihoub A., et al "An Imaging Library for a TriCore based Digital Camera" Computer Architectures for Machine Perception, 2000. Proceedings, Fifth IEEE International Workshop on Padova, Italy, Sep. 11-13, 2000, Los Alamitos, CA USA, IEEE Computer Soc., US, Sep. 11, 2000, pp. 3-11, XP0108515284, ISBN: 0-7695-0740-9.

Japanese Office Action dated Aug. 11, 2009 and English translation thereof issued in a counterpart Japanese Application No. 2004-321421.

* cited by examiner

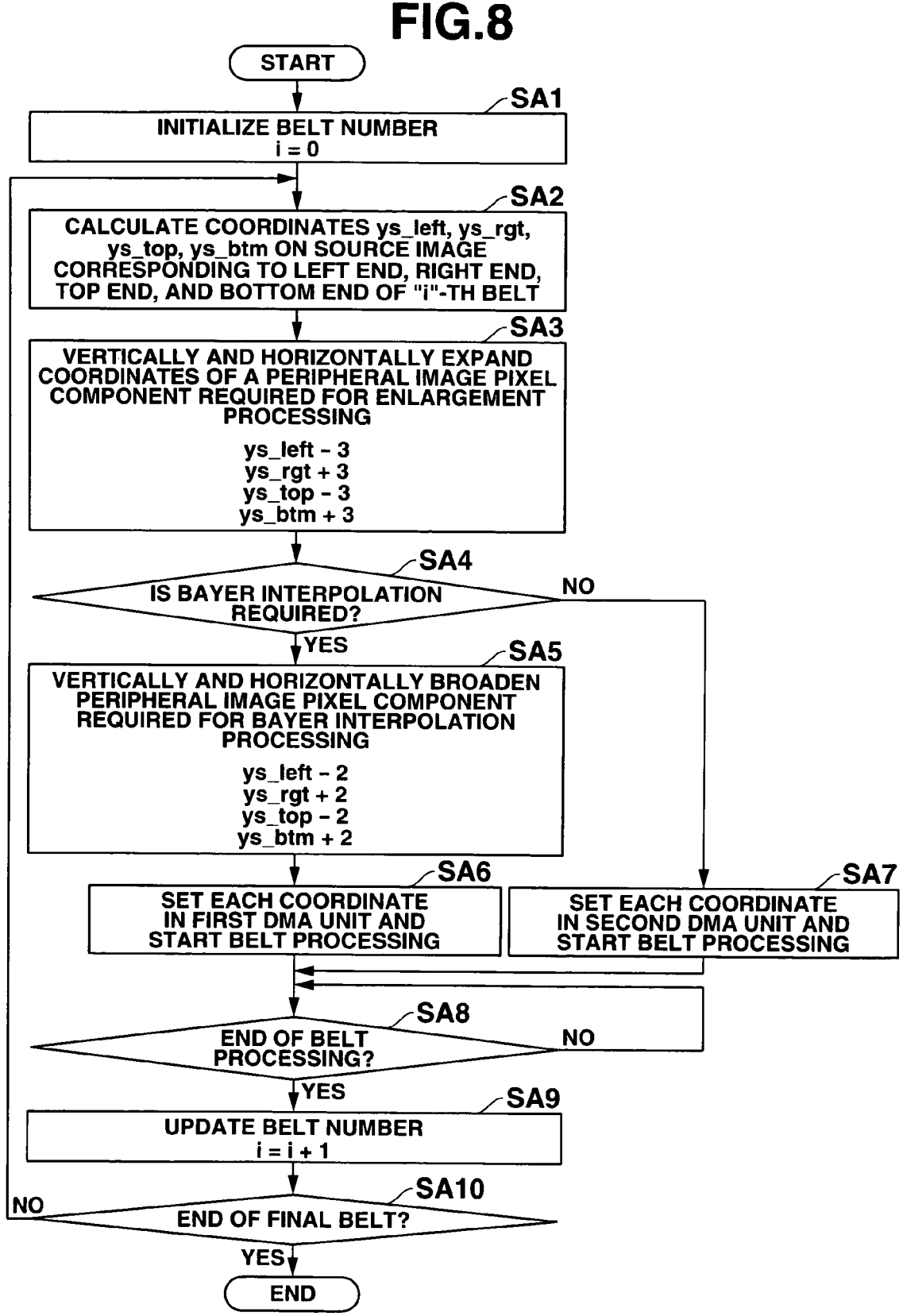

FIG.10

| | VERTICAL | | | | | | HORIZONTAL | | | | | | |
|---|---|---|---|---|---|---|---|---|---|---|---|---|---|
| | ENLARGED IMAGE COORDINATE | | SOURCE IMAGE COORDINATE | | INPUT RANGE | | | ENLARGED IMAGE COORDINATE | | SOURCE IMAGE COORDINATE | | INPUT RANGE | |
| | TOP END | BOTTOM END | TOP END | BOTTOM END | TOP END | BOTTOM END | THE NUMBER OF LINES | LEFT END | RIGHT END | LEFT END | RIGHT END | LEFT END | RIGHT END | THE NUMBER OF PIXELS |
| BELT 0 | 0 | 7 | 0.8 | 2.2 | 0 | 3 | 4 | 0 | 31 | 1.5 | 7.7 | 1 | 8 | 9 |
| BELT 1 | 8 | 15 | 2.4 | 3.8 | 2 | 4 | 3 | | | | | | | |
| BELT 2 | 16 | 23 | 4.0 | 5.4 | 4 | 6 | 3 | | | | | | | |
| BELT 3 | 24 | 31 | 5.6 | 7.0 | 5 | 7 | 3 | | | | | | | |

IMAGE PROCESSING APPARATUS CAPABLE OF CARRYING OUT MAGNIFICATION CHANGE PROCESS OF IMAGE

CROSS-REFERENCE TO RELATED APPLICATIONS

This application is based upon and claims the benefit of priority from prior Japanese Patent Application No. 2004-321421, filed Nov. 5, 2004, the entire contents of which are incorporated herein by reference.

BACKGROUND OF THE INVENTION

1. Field of the Invention

The present invention relates to an image processing apparatus and an image processing method which can be used for a digital camera.

2. Description of the Related Art

Conventionally, in, for example, a digital camera for recording captured digital image data in a recording medium, plural stages of image processing are carried out in the course of recording. For example, image processing are carried out, such as: (i) a Bayer interpolation processing for converting Bayer data temporarily stored in a memory at the time of capturing, i.e., image data composed of pixels of color information according to color filters in a primary color Bayer array into YUV data (luminance and color difference data) which includes RGB data for each pixel; (ii) a magnification change processing for increasing or decreasing the number of pixels of the YUV data after converted, thereby achieving a digital zoom function or the like; and (iii) a JPEG encode processing. In addition, in such an image processing, data for a plurality of lines called a band-shaped belt obtained by dividing the whole screen in a vertical direction has been defined in processing units instead of defining data on the whole image (Bayer data or YUV data) in processing units, and the data has been read out and processed sequentially from a work memory belt by belt.

On the other hand, at the time of the JPEG encode processing, encoding is carried out in block units (MCU) of 8×8 pixels if the encode format is, for example, 4:2:2, and encoding is carried out in block units of 16×16 pixels if the above format is 4:2:0. Thus, in the case where each of the above-described processings is carried out by hardware for the purpose of high speed operation, it is necessary to provide 8 or 16 lines of a belt to be input to a unit for the JPEG encode processing. Therefore, a magnification which can be set in the magnification change processing prior to the JPEG encode processing is limited to a value which corresponding to the number of lines which can be directly processed by the JPEG encode processing, i.e., the magnification is limited to a multiple of 8.

In order to solve this problem, Jpn. Pat. Appln. KOKAI Publication No. 2003-18610 discloses a method of additionally providing a buffer memory in a unit for magnification change processing; temporarily decompressing and storing YUV data for one screen after magnification-changed; and transferring the YUV data from the buffer memory to a unit for JPEG encode processing in units of 8 lines at a time when the YUV data for one screen is stored in the buffer memory. According to such a method, a digital zoom function capable of setting a vast variety of magnifications can be achieved without being subject a restriction to the magnifications.

BRIEF SUMMARY OF THE INVENTION

According to an embodiment of the present invention, an image processing apparatus comprises:

a transferring unit which transfers units of image data, the unit of image data including plural lines;

a magnification change unit which carries out a magnification change processing to each input unit of the image data transferred by the transferring unit;

a magnification setting unit which sets a magnification of the magnification change unit; and a transfer number setting unit which sets the number of lines included in the input unit transferred by the transferring unit based on the magnification set by the magnification setting unit.

According to another embodiment of the present invention, an image processing method which transfers units of image data, the unit including plural lines, carries out a magnification change processing to each unit of the transferred image data, and outputs units of the image data after magnification-changed, the output unit including plural lines, the method comprises steps of:

setting a desired number of lines included in the output unit;

setting a magnification of the magnification change processing; and setting the number of lines of each input unit based on the set magnification such that the number of lines included in the output unit equals to the desired number of lines.

According to another embodiment of the present invention, a computer program for an image processing apparatus which transfers units of image data, the unit including plural lines, carries out a magnification change processing to each unit of the transferred image data, and outputs units of the image data after magnification-changed, the output unit including plural lines, the program being stored in a computer readable medium, and the program comprises:

setting a desired number of lines included in the output unit;

setting a magnification of the magnification change processing; and setting the number of lines of each input unit based on the set magnification such that the number of lines included in the output unit equals to the desired number of lines.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 8 is a flow chart showing a processing relating to data transfer by a control unit;

FIG. 10 is a view showing a relationship between a coordinate position of an enlarged image and a coordinate position of a source image in each belt in FIGS. 9A and 9B;

DETAILED DESCRIPTION OF THE INVENTION

Figure 1:
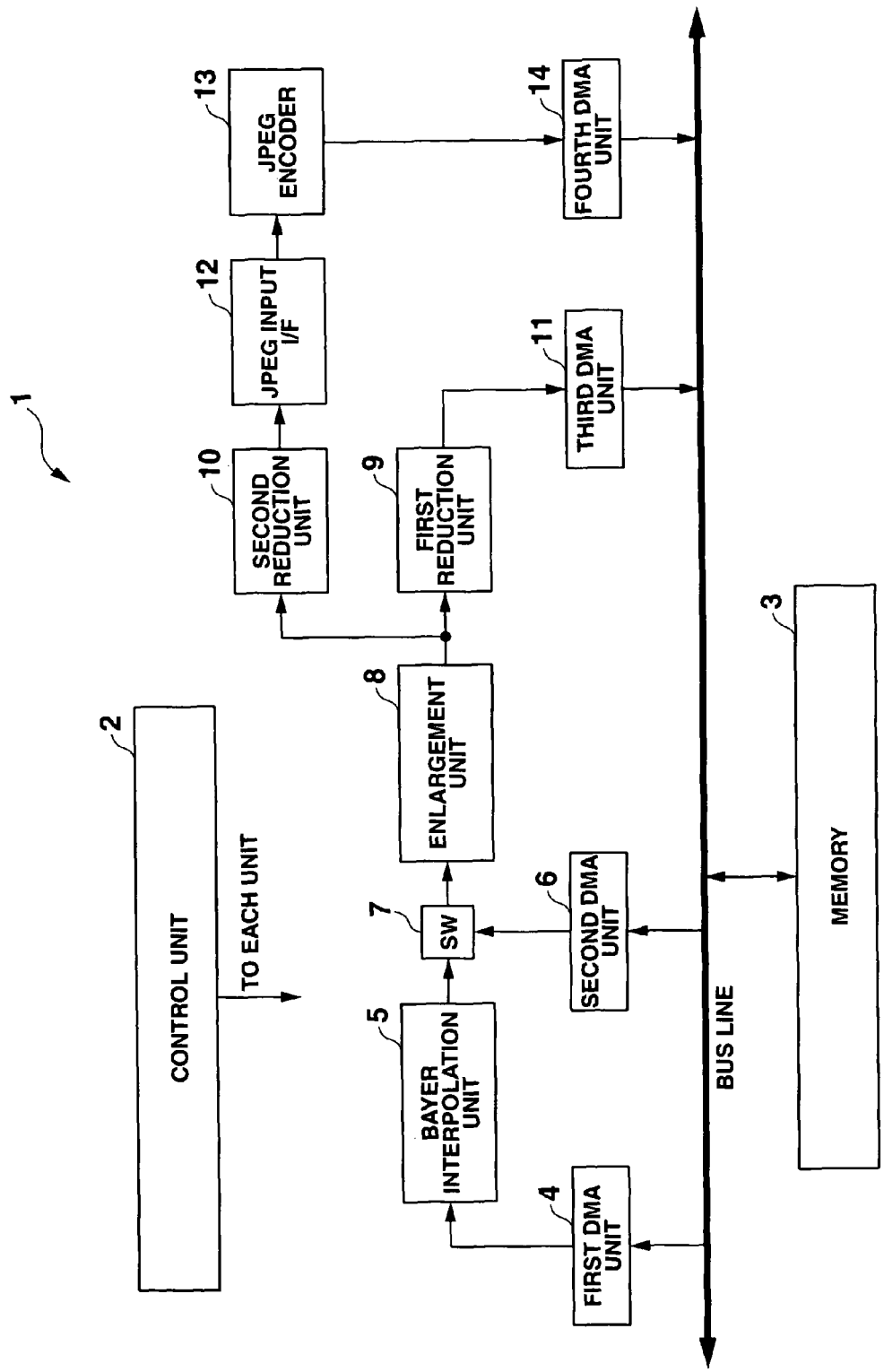
FIG. 1 is a circuit diagram depicting a general configuration of an image processing apparatus according to the present invention.

An embodiment of an image processing apparatus and an image processing method according to the present invention will now be described with reference to the accompanying drawings. FIG. 1 is a block diagram depicting a configuration of an image processing apparatus 1 according to an embodiment of the invention. The image processing apparatus 1 is incorporated in a digital camera having a digital zoom function. The apparatus is intended for carrying out an interpolation processing for generating YUV data from Bayer data output from an image pickup device such as a CCD, and a magnification change processing for increasing or decreasing the number of pixels of the generated YUV data at a set magnification. The magnification change processing used here is provided as, for example, a processing for recording an image of its size smaller than the number of pixels of the image pickup device or enlarging an image by the digital zoom function of the digital camera.

A control unit 2 is intended for controlling the whole operation of the digital camera, and includes a peripheral circuit (not shown) including a CPU, a program ROM, a RAM, and an input and output interface. In addition, each section of the image processing apparatus 1 is controlled based on a program stored in the program ROM, whereby the control unit 2 functions as number setting means, magnification setting means, number control means, or magnification control means.

A memory 3 is a DRAM or the like which temporarily stores Bayer data output from a CCD or the like and YUV data, and is also a transfer destination to which a JPEG encoding result is to be output. The memory 3 has a sufficient capacity for temporarily storing each item of data.

A first direct memory access (DMA) unit 4 is a data transfer unit which reads out image data in a Bayer format from the memory 3 in predetermined data units and transfers the read image data to a Bayer interpolation unit 5 in response to an instruction from the control unit 2. A second DMA unit 6 is a data transfer unit which reads out image data in a YUV data format from the memory 3 in predetermined data units and transfers the read image data to an enlargement unit 8 via a switch 7. The switch 7 changes the image data to be input to the enlargement unit 8 between the YUV data output from the Bayer interpolation unit 5 and the YUV data on the memory 3 to be transferred from the second DMA unit 6 in response to an instruction from the control unit 2.

Figure 2A:
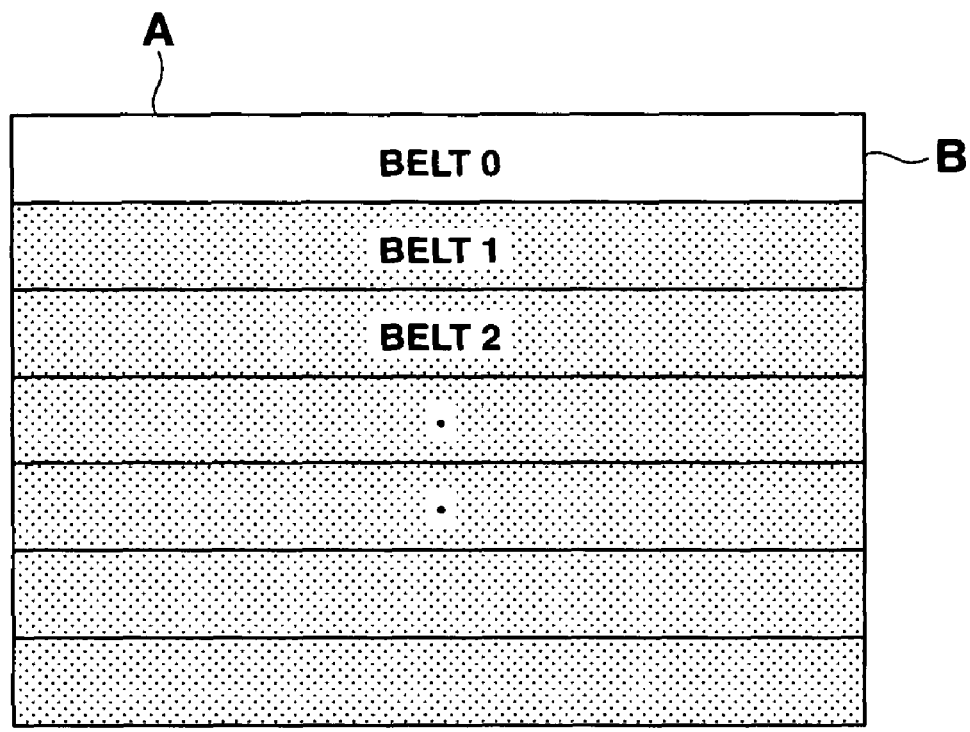
FIG. 2A is a schematic view showing a belt defined in image processing units.
Figure 2B:
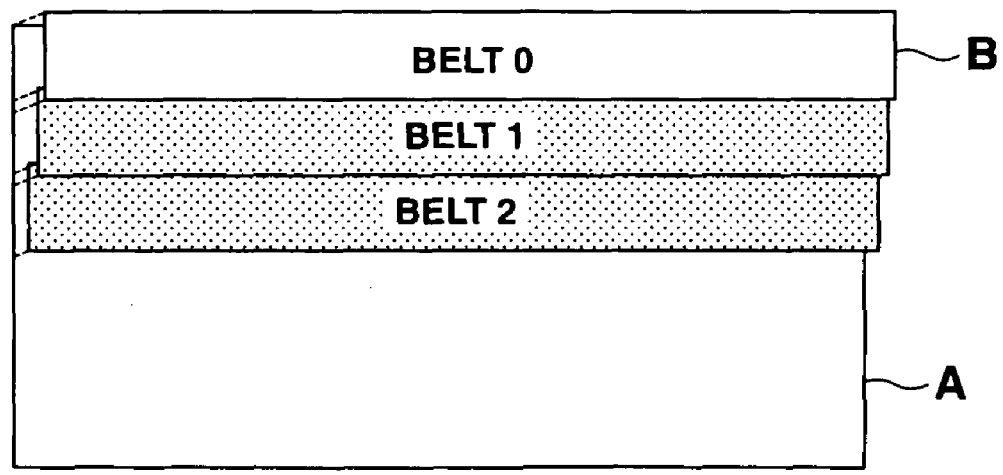
FIG. 2B is a schematic view showing a belt defined in image processing units.
Figure 3:
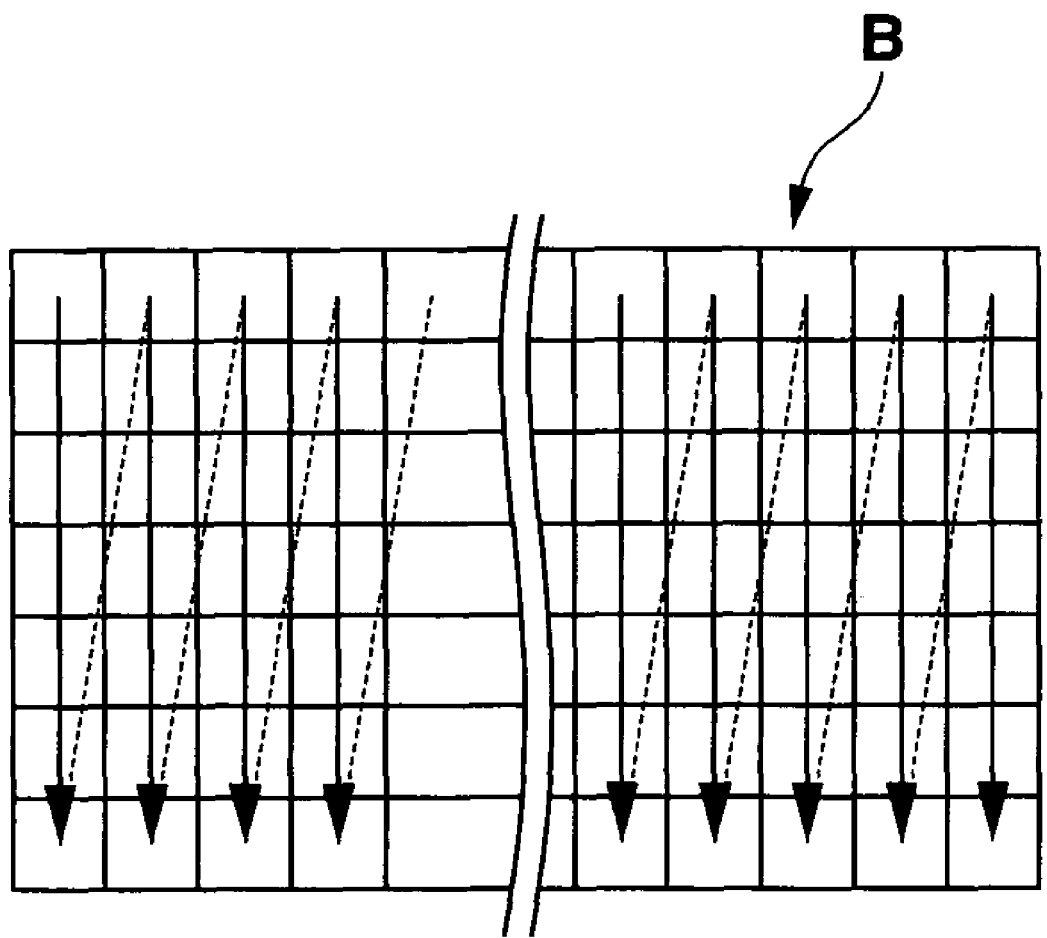
FIG. 3 is a view showing a method of transferring data read out from a memory.

The image data read out from the memory 3 by the first DMA unit 4 and the second DMA unit 6 (both of which corresponds to transfer means) is provided as image data on a band-shaped rectangle portion obtained by dividing the whole image "A" into a predetermined size in a vertical direction, as shown in FIG. 2A, and is provided as image data "B" which includes data on pixels for a plurality of lines. This is called a belt. With respect to each of belts B0, B1, B2, . . . , data of line or lines may be overlapped on the immediately preceding belt depending on the processing operation, as shown in FIG. 2B. For example, when four lines forms one belt, the belt 0 is formed of line 0 to line 3 and the belt 1 is formed of line 3 to line 6 and so on. Further, in the first DMA unit 4 and the second DMA unit 6, data on a belt B read out from the memory 3 is temporarily stored in its internal memory. In addition, as shown in FIG. 3, the data on the belt B is scanned pixel by pixel in a vertical direction, and the scanned data is output to a rear stage. Such data scanning is called belt scanning.

Figures 4A, 4B:
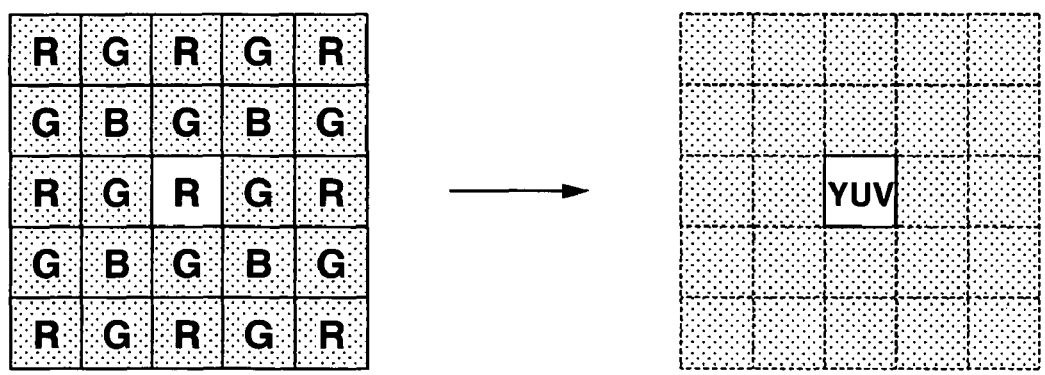
FIG. 4A is a view showing an example of Bayer data.
FIG. 4B is a conceptual view when YUV data is generated from Bayer data.

The Bayer interpolation unit 5 carries out an interpolation processing from the Bayer data transferred from the first DMA unit 4 (refer to FIG. 4A), and finally outputs the interpolated data as YUV data. In this embodiment, YUV data for one pixel is generated from Bayer data on 5×5 pixels, as shown in FIG. 4B.

Figure 5:
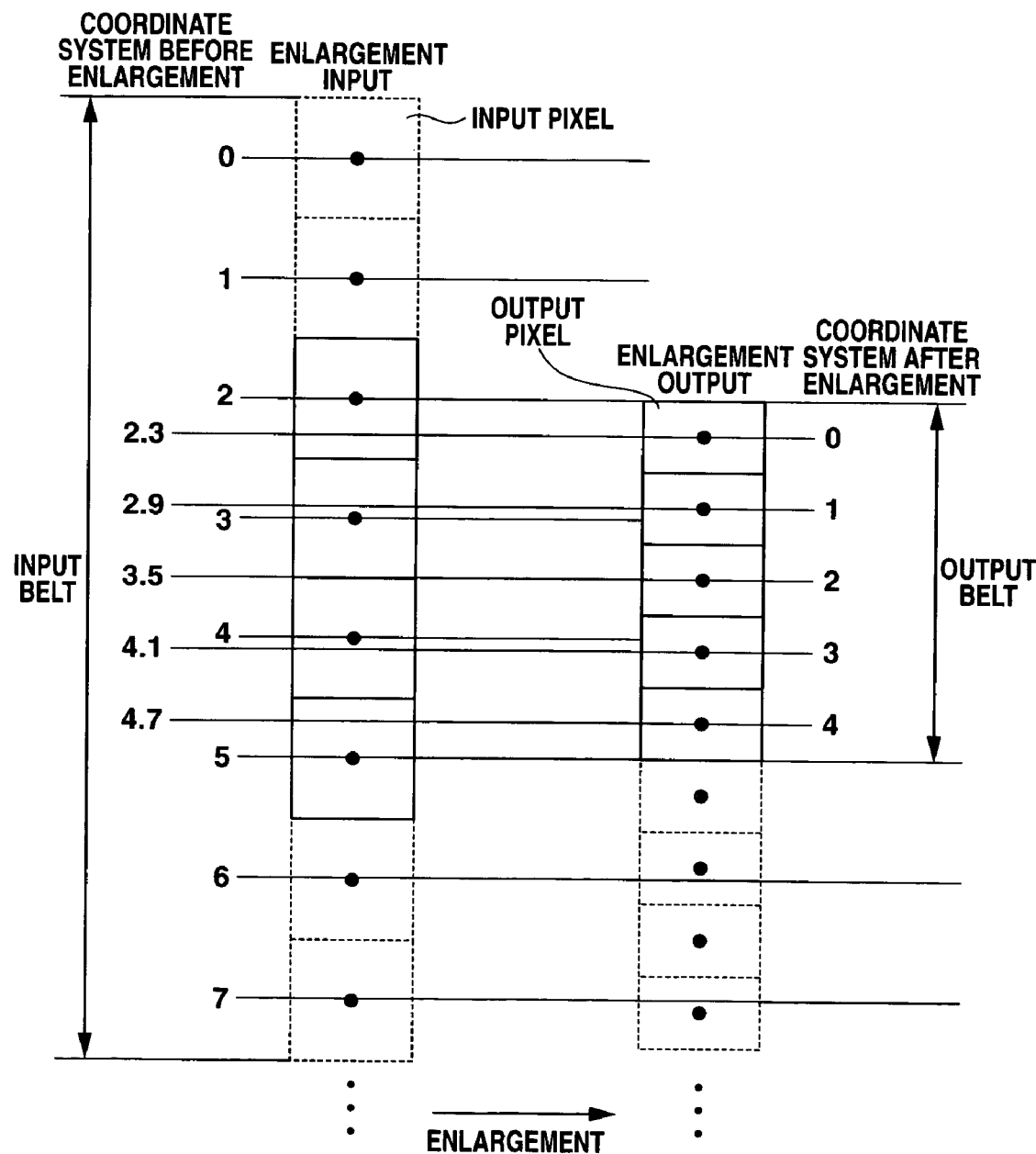
FIG. 5 is a view showing an example of a correlation between a pixel and an interpolation point of a source image in an enlargement processing.

The enlargement unit 8 enlarges the YUV data input via the switch 7 with a desired magnification (increases the number of pixels) in response to an instruction from the control unit 2, and selectively outputs the enlarged data to a first reduction unit 9 or a second reduction unit 10 serially connected in a parallel state at the rear stage side. Data is input to and output from the enlargement unit 8 by belt scanning, respectively. A magnification can be horizontally or vertically set independently, and an enlargement algorithm is provided as a linear interpolation for horizontally and vertically obtaining an interpolation result of one pixel from the peripheral 6 pixels. FIG. 5 shows an example of vertical 5/3 times. For example, when an interpolation point exists between pixel "2" and pixel "3" in a source image ("2.3" or "2.9" in the figure), the interpolation point (output pixel) is obtained by using a pixel of "0" to "5" and using Lanczos as an interpolation coefficient. The magnification setting is specified at pixel intervals when one pixel in the source image is divided into 16384 sections. For example, in the case of 2 times, 8192 is obtained, and in the case of 4 times, 4096 is obtained. Therefore, an arbitrary magnification which can be expressed by this resolution can be set.

Figure 6:
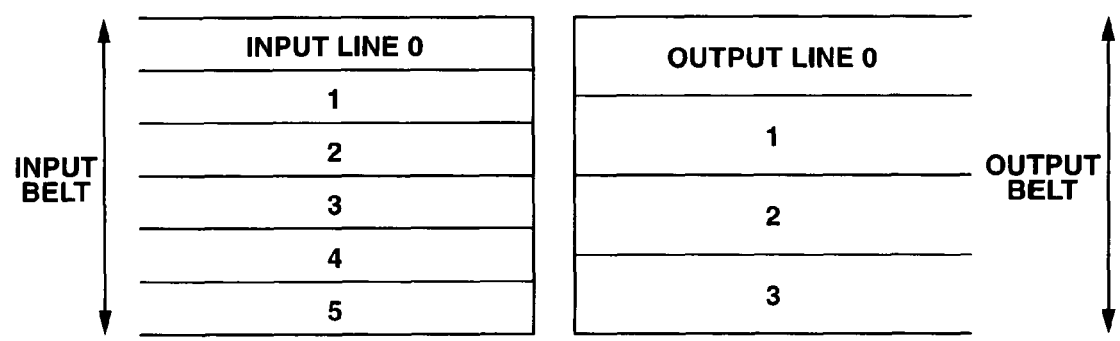
FIG. 6 is a view showing an example of the numbers of lines between an input side belt and an output side belt in a reproduction processing.

The first reduction unit 9 and the second reduction unit 10 carry out a reduction processing with respect to the input YUV data and outputs the resulting data. A reduction algorithm is in accordance with an average operating technique, and data input and output are tool place as belt scanning, respectively. A magnification can be horizontally and vertically set independently. When the magnification is defined as "n/m" (n≦m), "n" can be set in the range of 1 to 256, and "m" can be set in the range of 1 to 256 in a horizontal magnification. In a vertical magnification, "n" can be set in the range of 1 to 16, and "m" can be set in the range of 1 to 32. Values "m" and "n" of a vertical magnification are obtained as the number of lines at the input side and the number of lined at the output side of a belt to be processed, respectively. FIG. 6 shows an example in the case where vertical 6 lines are reduced to 4 lines.

The first reduction unit 9 and the second reduction unit 10 are completely equivalent units. A different magnification can be set in a restriction that magnification settings are common to each other in denominator (m) of magnification, respectively, with respect to both of the reduction units 9 and 10. However, with respect to a nominator (n) of magnification in the second reproduction unit 10 (=the number of lines of output belt), "8" or "16" is selected according to the format of JPEG encoding from the viewpoint of connection to a JPEG input interface (I/F) 12 at the rear stage.

A third DMA unit 11 is a data transfer unit which receives image data obtained by belt scanning from the first reduction unit 9 in response to an instruction from the control unit 2 and transfers the received image data to a corresponding area on the memory 3.

Figure 7:
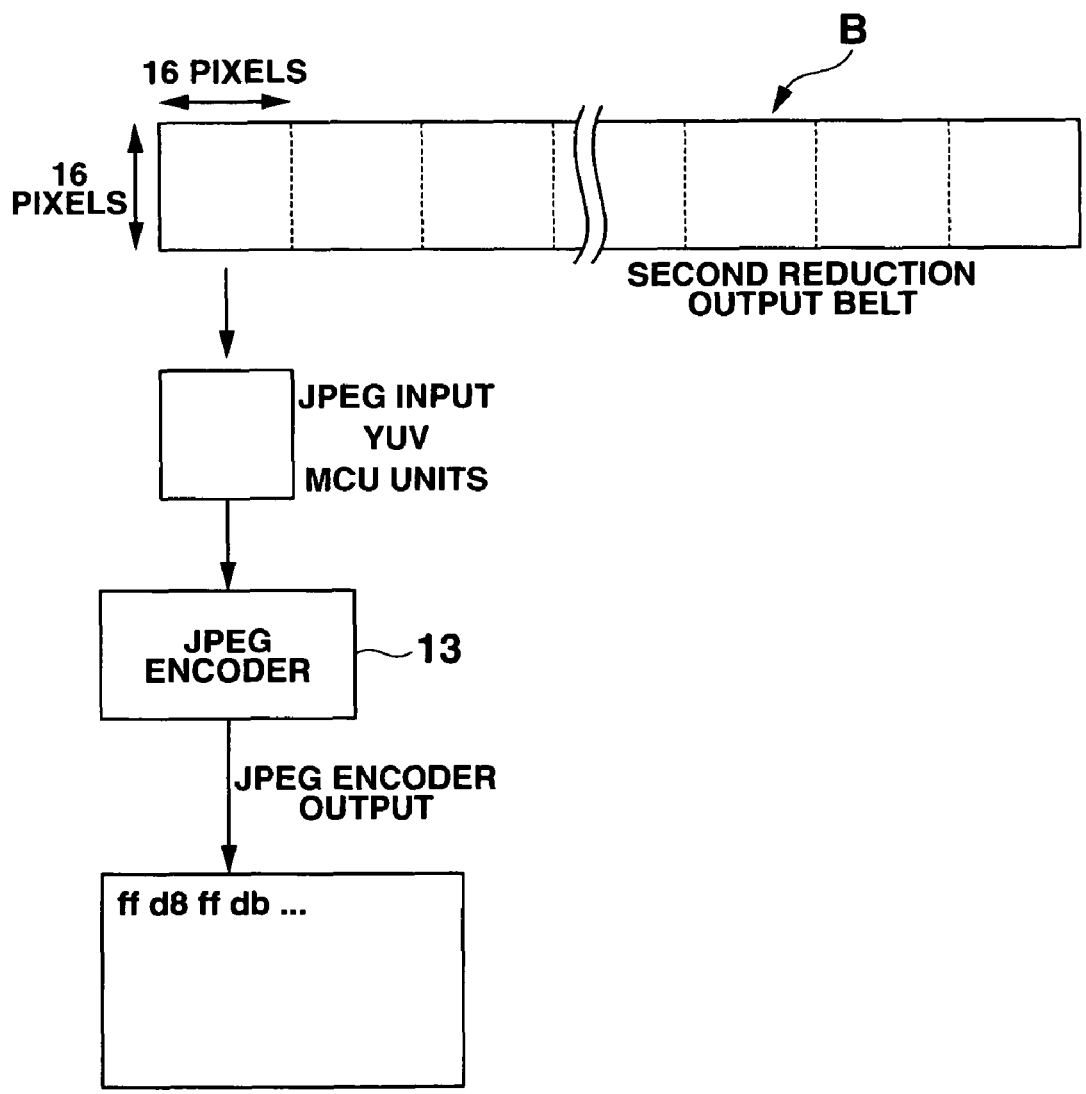
FIG. 7 is a schematic view showing input and output data in a JPEG encoder when a JPEG encoding format is 4:2:0.

The JPEG input I/F 12 is an interface unit which temporarily stores the image data (YUV data) input by belt scanning in pixel block units (MCU), carries out data conversion to 4:2:2, 4:2:0 or the like in a format according to the input format (Y:Cb:Cr) at the side of a JPEG encoder 13, and outputs the converted data. That is, when the above input format is 4:2:0, 16×16 pixels are output as pixel block units, as shown in FIG. 7. When the input format is 4:2:2, 8×8 pixels are output as pixel block units. The JPEG encoder 13 JPEG-encodes the input YUV data in the format of 4:2:2 or 4:2:0, and outputs the encoded data. A fourth DMA unit 14 is a data transfer unit which transfers the encoded data to the corresponding area on the memory 3.

Now, the content of processing of the control unit 2 will be described here. First, a description will be given with respect to the content of processing relating to data transfer under the control of the first DMA unit 4 and the second DMA unit 6. FIG. 8 is a flow chart showing procedures for the above processing. The control unit 2 starts processing and carries out initialization of belt number "i" targeted to be processed (step SA1), and calculates the coordinates (ys_left, ys_rgt, ys_top, ys_btm) on a source image (Bayer data or YUV data) which corresponds to a left end, a right end, a top end, and a bottom end of an i-th belt (0-th belt when processing starts) (step SA2). In the embodiment, the following calculation is carried out.

Figure 9A:
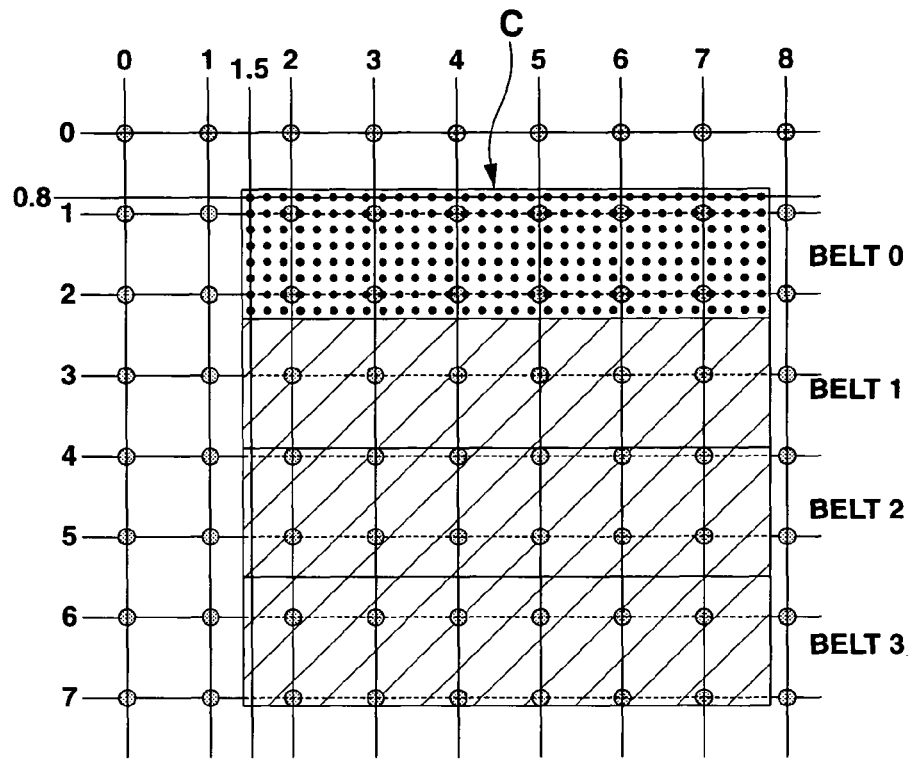
FIG. 9A is a view illustrating an example when an input range of each belt is set with respect to a source image.
Figure 9B:
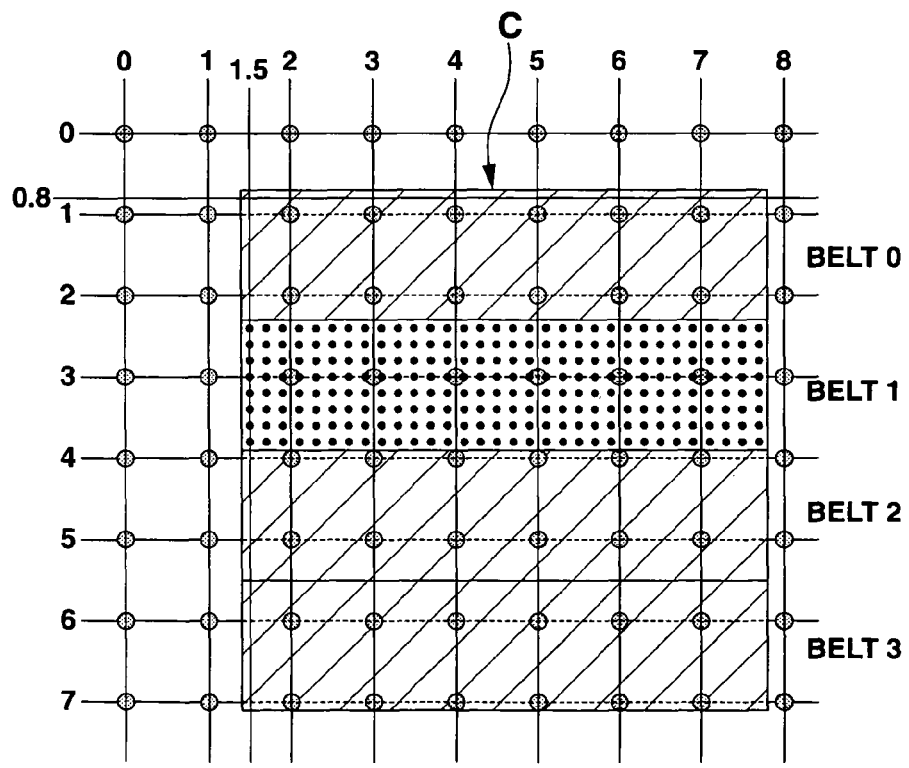
FIG. 9B is a view illustrating an example when an input range of each belt is set with respect to a source image.

Here, as an example, it is assumed that an enlargement processing is carried out with respect to YUV data in the case where a digital zoom function has been set. For the sake of convenience, a description will be given assuming that: the horizontal and vertical enlargement rates are 5 times; the size of the enlarged image is of 32×32 pixels; and the number of lines of each belt is "8" (=the number of belts of the enlarged image is "4"). FIGS. 9A and 9B are views each showing a relationship between a source image (YUV data) at the time of belt processing on that presumption and belt 0 to belt 3 in the enlarged image (image finally input to the JPEG encoder) C corresponding thereto. In the figure, the pixels of the source image are marked with large circles. Among them, the pixels in the range of the processing belts, i.e., the pixels in the range of the 0-th belt in FIG. 9A and the first belt in FIG. 9B are marked with lightly filled circles. In addition, the pixels in the range (32×8 pixels) of output belts relevant to the processing belts are marked with small black circles.

When the coordinate of each pixel in the enlarged image C is (xb, yb); reciprocal numbers of the enlargement rates in the horizontal and vertical directions are (xstep, ystep); and the position on the source image corresponding to a top left end on the enlarged image C is (x0, y0), the source image compatible coordinate (xs, ys) of the source image can be obtained by:

$$xs = xb \times xstep + x0$$

$$ys = yb \times ystep + y0$$

In the embodiment, the coordinate positions of the left end, right end, top end, and bottom end of each belt are calculated by the formula above. At this time, a processing for truncating digits below a decimal point is carried out with respect to a calculation result of the left end and the top end, and a processing for truncating digits below a decimal point is carried out with respect to a calculation result of the right end and the bottom end, thereby obtaining a final calculation result.

FIG. 10 is a view showing a correlation among the coordinate of the left end, right end, top end, and bottom end of the enlarged image C in each belt shown in FIGS. 9A and 9B, obtained by the above calculation; the coordinate of the left end, right end, top end, and bottom end of the source image directly obtained by the above formula; and the coordinate of the left end, right end, top end and bottom end as the input range serving as the final calculation result. From among the values of each of the coordinates illustrated, the position (x0, y0) on the source image corresponding to the left top end on the enlarged image C, required for calculation of the source image compatible coordinate (xs, ys), namely, the top end (vertical coordinate: 0.8) and the left end (horizontal coordinate: 1.5) in the source image compatible coordinate in belt 0 are determined as the coordinate values which depend on a relationship with an enlargement rate. In the present embodiment, the above coordinate values can be obtained from a compatible table prepared in the program ROM or the like of the control unit 2.

Subsequently, these coordinates are expanded by pixel or pixels required for an enlargement processing (step SA3). Here, it is assumed that enlargement is carried out vertically and horizontally by 3 pixels. Next, when a source image is Bayer data, and Bayer interpolation is required (YES in step SA4), these coordinates are expanded by pixel or pixels required for the Bayer interpolation processing in the Bayer interpolation unit 5 (step SA5). Here, it is assumed that enlargement is carried out vertically and horizontally by 2 pixels. Then, the obtained coordinate is set in the first DMA unit 4 as an input region of the source image, and a belt processing (data transfer by belt scanning) is started (step SA6). In addition, when the source image is YUV data instead of Bayer data (NO in step SA4), the coordinate obtained in step SA3 is set in the second DMA unit 6 as an input region of the source image, and then, a belt processing is started (step SA7). Then, the belt processing terminates (YES in step SA8), a belt number "i" is updated (incremented) (step SA9).

Subsequently, processing returns to step SA2 in which the processing described above is repeated, and processing is terminated at a time point at which the processing for a belt of the last belt number, namely, processing for one image has terminated.

Figure 11:
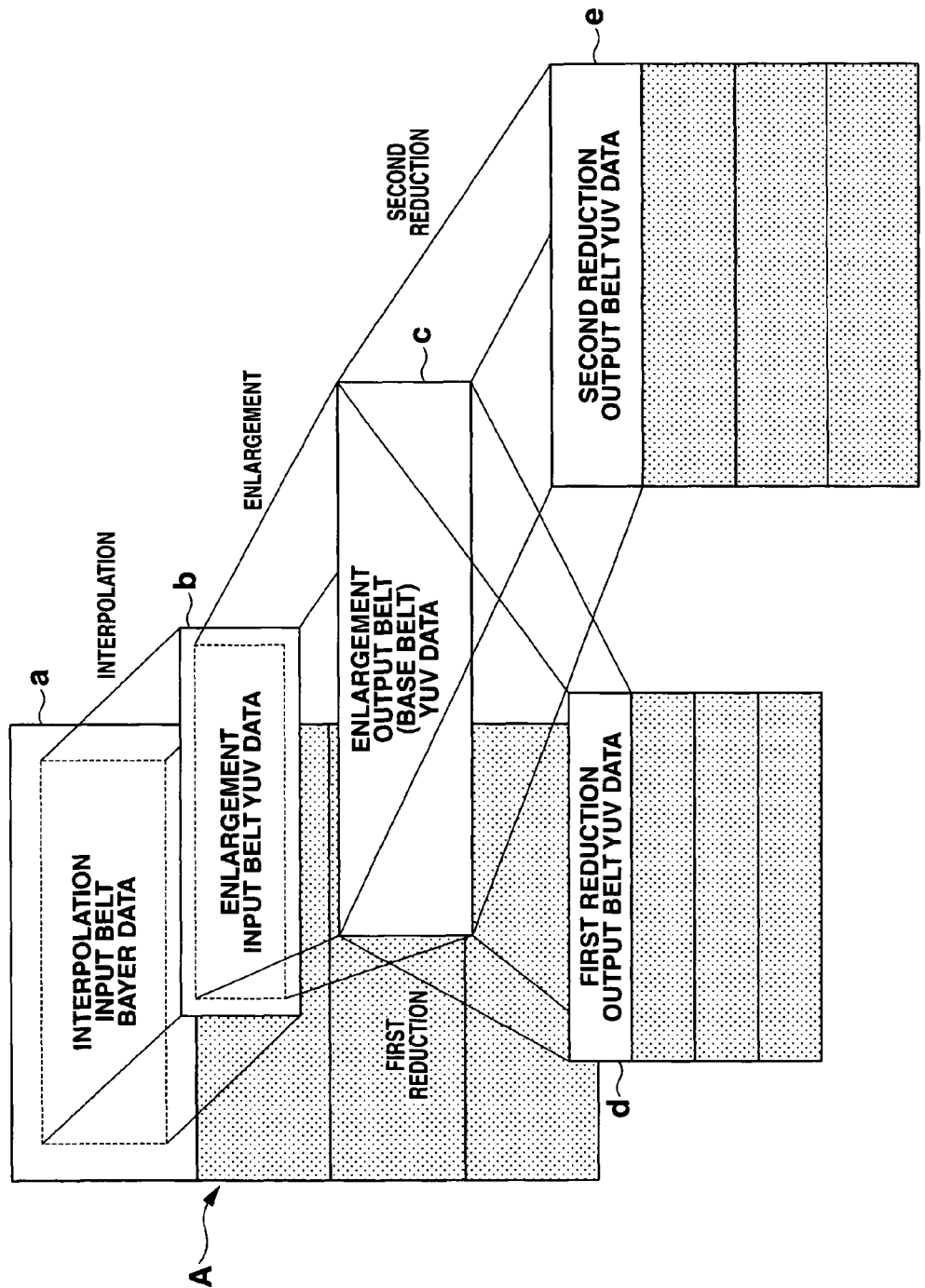
FIG. 11 is a transition chart showing a change of the contents of data on each belt in each section of the image processing apparatus.

FIG. 11 is a transition chart showing a change of the content of data on each belt in each section of the image processing apparatus 1 together with the above-described processing of the control unit 2. That is, interpolation input belt Bayer data "a" in the source image A transferred from the memory 3 is pixel-interpolated in the Bayer interpolation unit 5. Thereafter, the pixel-interpolated data is transferred as enlargement input belt YUV data "b" to the enlargement unit 8. In addition, enlargement output belt (base belt) YUV data "c" subjected to the enlargement processing (increasing the number of pixels) is transferred to the first reduction unit 9 and the second reduction unit 10, and the transferred data is reduced at a different reduction rate. Then, the reduced data is output as first output belt YUV data "d" and second output belt YUV data "e". Among them, the second output belt YUV data "e" is output to the JPEG encoder 13 via the JPEG input I/F 12.

Then, in the above-described belt processing (data transfer), the left end, right end, top end, and bottom end of each belt (vertical source image coordinates in FIG. 10) are individually determined as shown in FIG. 10 by means of the calculation in step SA2. Namely, the number of lines is individually controlled, whereby the number of lines in the second output belt YUV data "e" input from the second reduction unit 10 to the JPEG encoder 13 via the JPEG input I/F 12 is maintained at the number of lines (here, 8 lines) according to the input format at the side of the JPEG encoder 13. Of course, the above calculation is based on an enlargement rate, and the enlargement rate is reflected on the number of lines to be controlled. For this reason, even if any enlargement rate (or reduction rate) has been set without being limited to the enlargement rate described above, the number of lines of the second output belt YUV data "e" can be made equal to the number of lines according to the input format at the side of the JPEG encoder 13.

Figure 12:
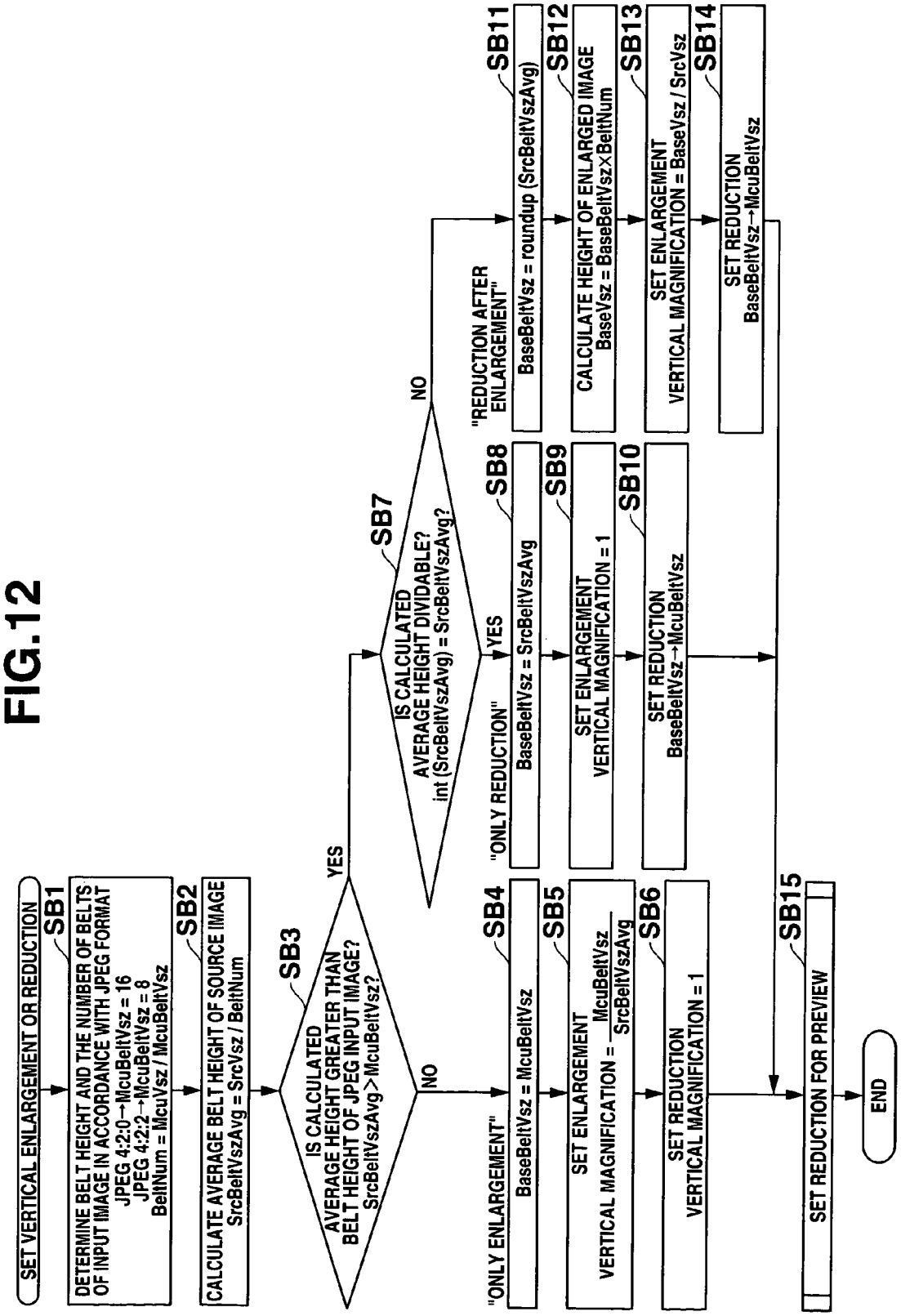
FIG. 12 is a flow chart showing a processing relevant to magnification setting by the control unit.

Now, a description will be given with respect to the content of processing when the control unit 2 sets a magnification in the enlargement unit 8, first reduction unit 9, and second reduction unit 10. FIG. 12 is a flow chart showing procedures for the above processing.

In FIG. 12, the meaning of abbreviations are as follows:
For source image
SreVsz:Height of input image
SreBeltVszAvg:Average belt height
Enlarged image
BaseVsz:Height of enlarged image
BaseBeltVsz:Belt height of enlarged image
JPEG input image
McuVsz:Height of JPEG input image
McuBeltVsz:Belt height of JPEG input image
Common to each image
BeltNum:Number of belts The magnification to be set is such a value which corresponds to a magnification required by the digital zoom function, for example. Here, a description will be given with respect to only the setting of magnification in the vertical direction.

When processing starts, the control unit 2 calculates the number of belts from the height of belt determined depending on the JPEG encoding format at the moment, namely, the number of lines ("16" or "8") and the size of the required JPEG input image (image to be input to the JPEG encoder 13) (step SB1). Next, an average belt height of the source image is calculated from the calculated number of belts and the height of the source image (step SB2), and it is determined whether or not the calculated average belt height is greater than the belt height of the JPEG input image (step SB3).

When a result of such determination is NO and the average belt height of the source image is equal to or smaller than the belt height of the JPEG input image, it is determined that only the enlargement processing is required. Then, it is set that the belt height of the enlarged image is equal to that of the JPEG input image (step SB4), a vertical magnification of the enlargement unit 8 is set at a magnification obtained from a rate between the belt height of the JPEG input image and the average belt height of the source image (step SB5), and a vertical magnification of the second reduction unit 10 is set to "×1" (step SB6).

On the other hand, when the determination result in step SB3 is YES, i.e., when the average belt height of the source image exceeds the belt height of the JPEG input image, it is further determined whether or not a result of calculation of the average belt height of the source image in step SB2 is obtained as a value which can be divided (step SB7). A function "int(r)" used herein is a function for truncating digits below a decimal point. When the value has been successfully divided (YES in step SB7), it is determined that only the reduction processing is required, and the belt height of the enlarged image is made equal to the average belt height of the source image (step SB8). Then, a vertical magnification of the enlargement unit 8 is set to "×1" (step SB9), and a vertical magnification of the second reduction unit 10 is set at a magnification obtaining by making the belt height of the enlarged image equal to the belt height of the JPEG input image (step SB10).

In addition, when a result of determination in step SB7 is NO, i.e., when a result of calculation of the average belt height of the source image in step SB2 is obtained as a value which cannot be divided, it is determined that there is a need for carrying out reduction after enlargement, and the belt height of the enlarged image is changed to a value obtained by truncating the belt height of the enlarged image (step SB11). A function "roundup(r)" used here is a function for truncating digits below a decimal point. Next, a virtual height of the enlarged image is calculated from the belt height and number of belts of the enlarged image after changed (step SB12). Then, a vertical magnification of the enlargement unit 8 is set at a magnification obtained from a rate between the virtual height of the enlarged image and the height of the source image (step SB13). Further, a vertical magnification of the second reduction unit 10 is set at a magnification obtained by making the belt height of the enlarged image equal to the belt height of the JPEG input image (step SB14).

A magnification of a combination according to a magnification required at that time is thus set in the enlargement unit 8 and the second reduction unit 10, whereby the number of belts and belt height of the enlarged image output from the second reduction unit 10 can be finally obtained as values according to the required magnification. That is, the size of the enlarged image is equal to that of the processing target according to the required magnification.

Figure 13:
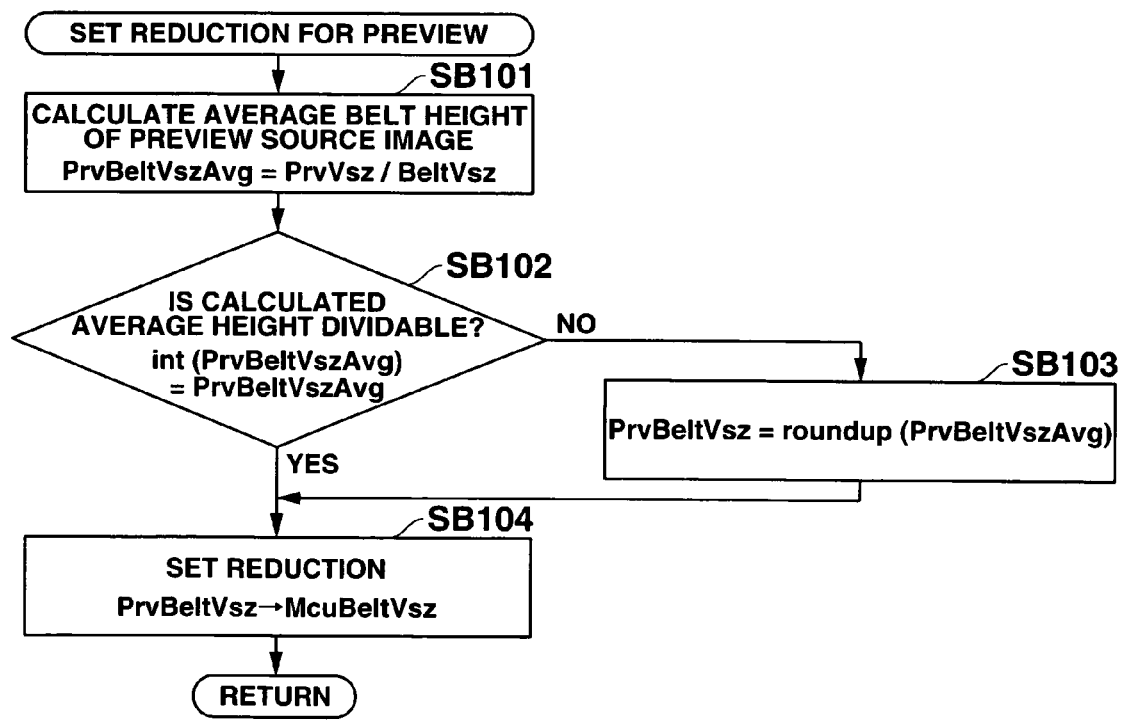
FIG. 13 is a flow chart showing a reduction setting processing for preview by the control unit.

Then, after any processing in steps SB6, SB10, and SB14 described above has terminated, a preview reduction setting processing shown in FIG. 13 is carried out (step SB15).

In FIG. 13, the meaning of abbreviations are as follows:
PrvVsz:Height of input image
PrvBeltVszAvg:Average belt height In such a processing, first, an average belt height of a preview source image is calculated from the number of belts of the JPEG input image acquired in step SB1 and a height of a predetermined preview image (display YUV data) (step SB101). It is determined whether or not a result of the calculation is obtained as a value which can be divided (step SB102). When the determination result is affirmative (YES in step SB102), a vertical magnification of the first reduction unit 9 is set at a magnification obtained by making the belt height of the preview source image equal to the belt height of the JPEG input image (step SB104). When the determination result is negative (NO in step SB102), on the other hand, the average belt height of the previous source image is rounded up, and the belt height of the preview source image is changed to a rounded up value (step SB103). Thereafter, a vertical magnification of the first reduction unit 9 is set at a magnification obtained by making the changed belt height of the preview source image equal to the belt height of the JPEG input image (step SB104). In this manner, the control unit 2 terminates magnification setting.

Figure 14:
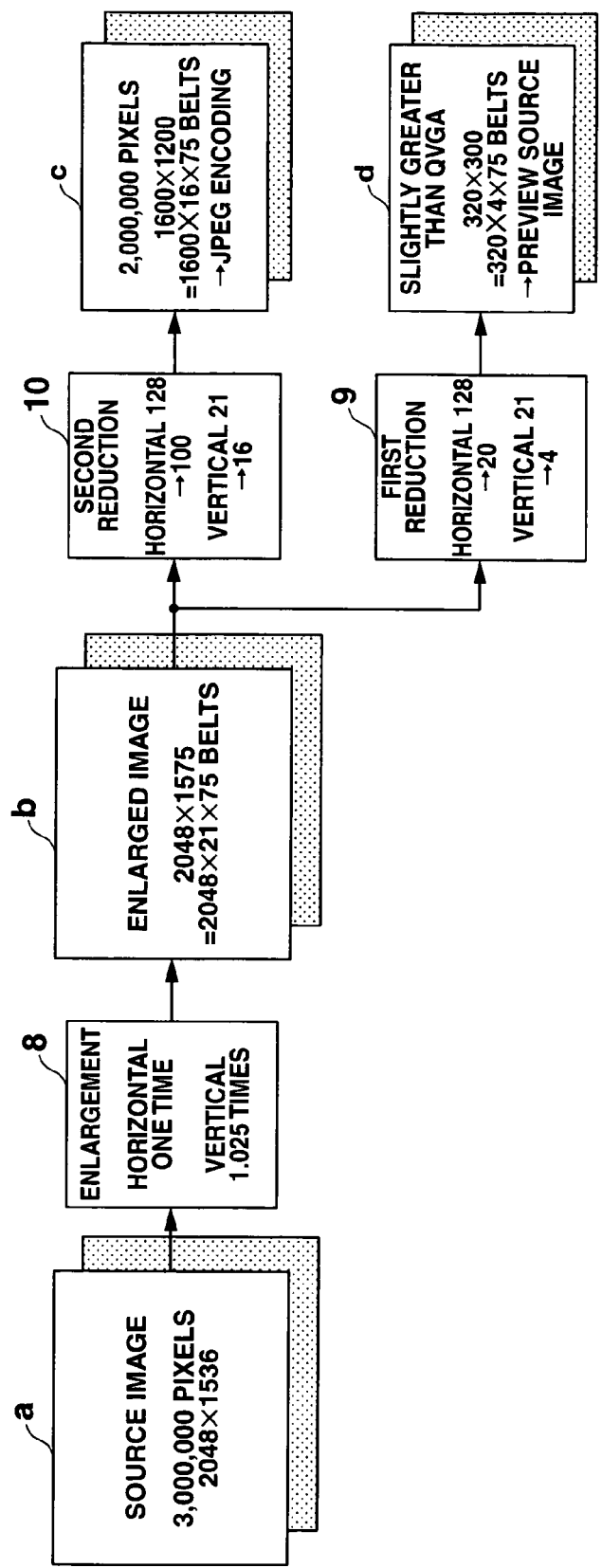
FIG. 14 is a view showing an example of a magnification set by a magnification setting processing and image data generated together with data transfer.

FIG. 14 is a view showing: a combination of specific set magnifications of the enlargement unit 8, first reduction unit 9, and second reduction unit 10 in the case where it has been determined that there is a need for carrying out reduction after enlargement at the time of the above magnification setting processing, and the processings in steps SB11 to SB14 have been carried out; and the content of the source image "a", enlarged image "b", JPEG input image "c", and preview source image "d". Here, there is shown a case where the JPEG encoding format is 4:2:0, the size of the source image "a" is of 3,000,000 pixels (2048×1536), the size of the JPEG input image according to the required magnification (reduction) is of 2,000,000 pixels (1600×1200), and the preview source image "d" is QVGA (240×320).

In such a case, the horizontal magnification of the enlargement unit 8 is "×1", and the vertical magnification thereof is "×1.025". The size of the enlarged image "b" is 2048×1575, the number of belts is 775, and the belt height is 21. In addition, the horizontal magnification of the second reduction unit 10 is "×100/128", and the vertical magnification thereof is "×16/21". The size of the JPEG input image "c" is its required size, 1600×1200, the number of belts is 75, and the belt height is 16. At the same time, the horizontal magnification of the first reduction unit 9 is "×20/128", and the vertical magnification thereof is "×4/21". The size of the preview source image "d" is 320×300 which is slightly greater than that of QVGA, the number of belts is 75, and the belt height is 4.

Figure 15:
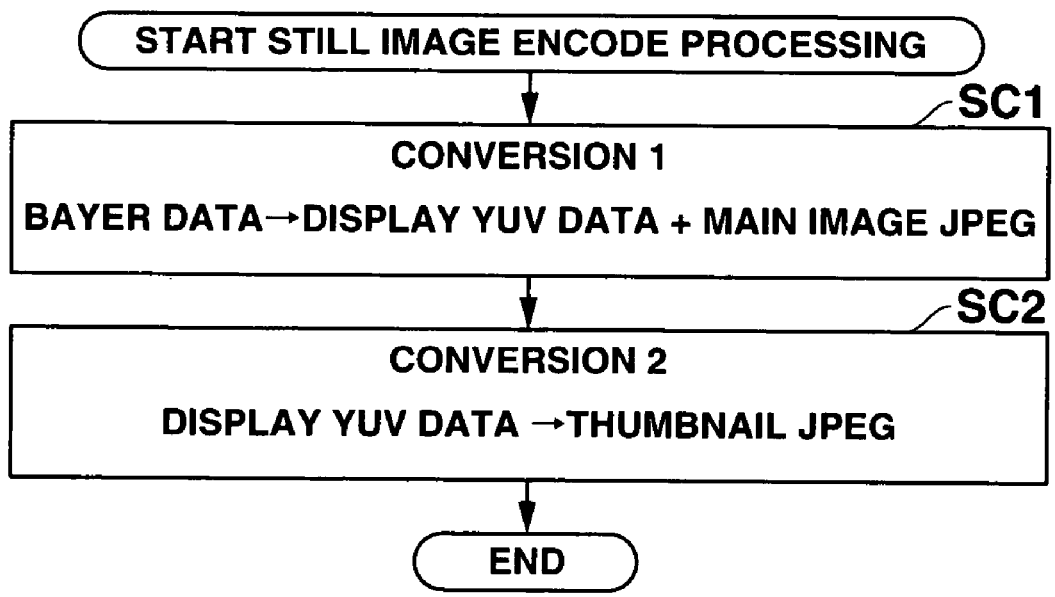
FIG. 15 is a flow chart showing a still image encode processing by the control unit.

Now, a description will be given with respect to a still image encode processing which the control unit 2 carries out based on the data transfer processing and magnification setting processing described above at the time of still image capturing operation in the digital camera. FIG. 15 is a flow chart showing procedures for the above processing. That is, first, by means of the first data conversion using the first reduction unit 9 in a series of the data transfer operations described above, the control unit 2 generates display YUV data (preview image) from Bayer data. Then, this control unit 2 outputs the generated YUV data to the memory 3, and at the same time, carries out JPEG encoding of a main image from Bayer data by means of a system using the second reduction unit 10, and then, outputs the encoded data to the memory 3 (step SC1). Subsequently, by means of the second data conversion using the second reduction unit 10 in a series of the data transfer operations described above, the control unit 2 carries out JPEG encoding of a thumbnail image associated with the main image from the display YUV data stored in the memory 3 during the first data conversion, and outputs the encoded data to the memory 3 (step SC2).

In the image processing apparatus 1, as described above, the image data stored in the memory 3 is enlarged or reduced belt by belt to carry out JPEG encoding. In this case, even when any enlargement rate (or reduction rate) has been set, the number of lines of a belt (second output belt YUV data "e") to be input to the JPEG encoder 13 can be made equal to the number of lines set by the JPEG encoder 13. Therefore, even if the JPEG encoder 13 exists at the rear stage side of the second reduction unit 10, there is no need for providing in the second reduction unit 10 a circuit such as a buffer memory for ensuring coincidence of the number of lines, and a magnification change processing by a variety of magnification settings can be carried out at a high speed with a simplified circuit configuration.

Figure 16:
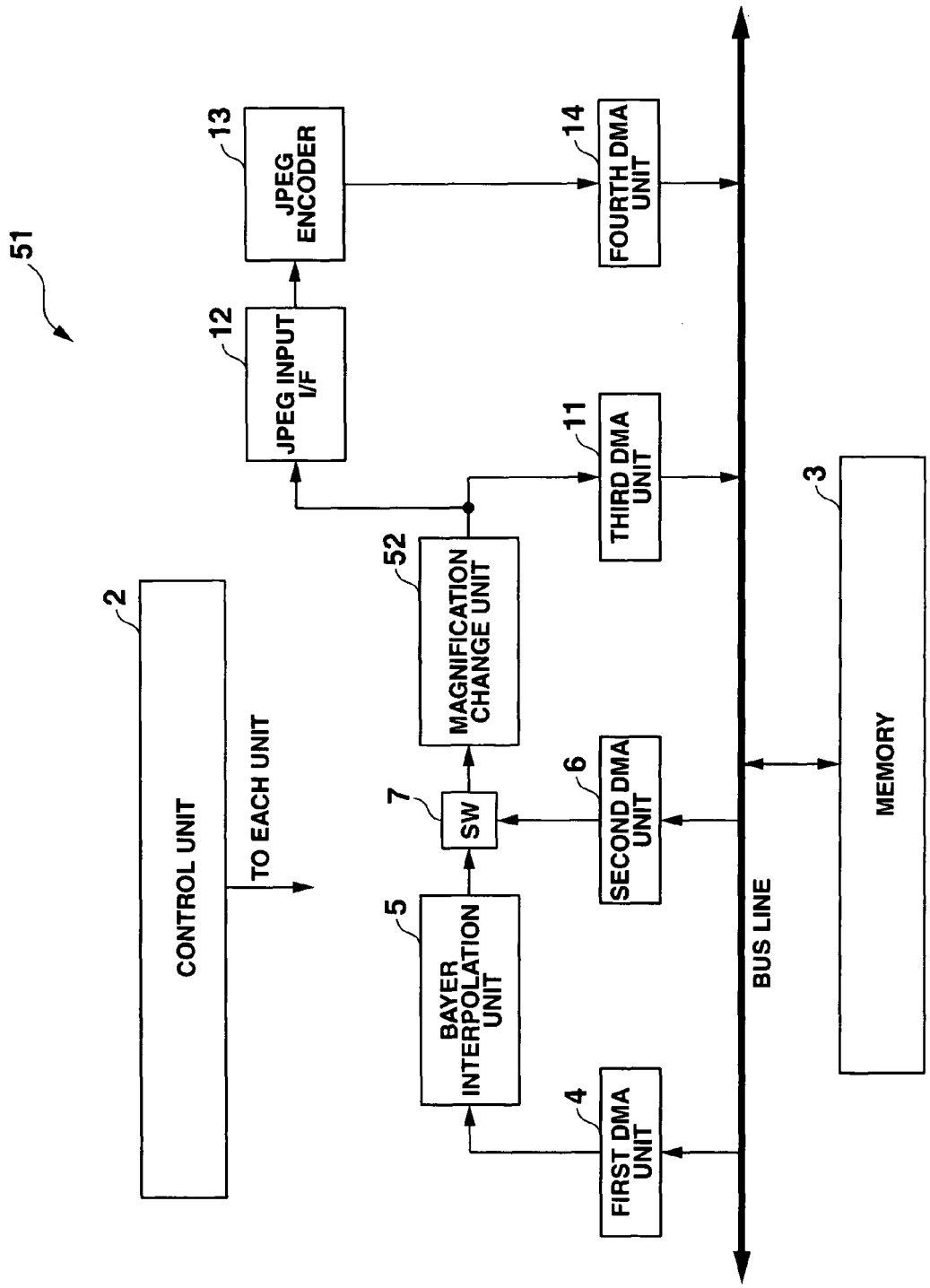
FIG. 16 is a circuit diagram depicting a general configuration of another image processing apparatus.

Such an advantageous effect can be attained in a configuration in which a single magnification change unit 52 is provided as a processing unit for image enlargement or reduction, as in an image processing apparatus 51 shown in FIG. 16, for example.

Although the first DMA unit 4 and the second DMA unit 6 carry out belt scanning pixel by pixel in the present embodiment, belt scanning may be carried out in units of two pixels. In addition, although the image data is transferred to the Bayer interpolation unit 5 and the switch 7 (enlargement unit 8) separately by using two devices, the first DMA unit 4 and the second DMA unit 6 in the present embodiment, they may be integrated with each other. Moreover, in the present embodiment only the Bayer interpolation unit 5 exists at the front stage of the enlargement unit 8. However, a plurality of processing units may be provided in series at the front stage of the enlargement unit 8, and these processing units may be provided in parallel or may be configured to be selectively connected by a changeover switch or the like.

In the present embodiment, as described above, reduction and/or enlargement at a magnification required for a source image is carried out by means of continuous enlargement and reduction processings in both of the enlargement unit 8 and the second reduction unit 10. Therefore, in the case where the required magnification is a reduction rate such that image degradation is caused in the second reduction unit 10, magnifications set to the enlargement unit 8 and the second reduction unit 10 are adjusted so as not to set such a reduction rate in the second reduction unit 10, thereby making it possible to carry out a reduction processing such that no image degradation occurs. As a result, a reduced image with high quality can always be obtained. Further, since the enlargement processing in the enlargement unit 8 and the reduction processing in the second reduction unit 10 are carried out in accordance with an algorithm suitable to each of these processings, an enlarged image or a reduced image with high quality can be obtained. In the present embodiment, the interpolation coefficient used in the enlargement unit 8 is defined as Lanczos, another interpolation coefficient can be used.

Moreover, in the embodiment, the first reduction unit 9 and the second reduction unit 10 have been connected in the enlargement unit 8 in parallel, and therefore, it is possible to generate images of their different sizes from the same source image at the same time, namely, efficiently within a short period of time. As a result, at the time of still image capturing operation described above, a main image, a thumbnail image associated therewith, and a preview image can be generated by the two data conversions, and concurrently, a capturing interval in the digital camera can be reduced. While the main image and preview image are generated by the first data conversion in the embodiment, another image having their different objects may be generated. For example, an image for measuring an encode quantity may be generated instead of the thumbnail image, and the generated image may be encoded by the JPEG encoder 13. In this case, the main image may be generated by the second data conversion. Further, although not shown, in addition to the first reduction unit 9 and the second reduction unit 10, another reduction unit may be provided in parallel to the two units. In this case, the two data conversion processings described above can be replaced with a single data conversion.

Although the image data after enlarged or reduced is YUV data in the present embodiment, the image data after enlarged or reduced may be RGB image data. Although the image data after enlarged or reduced is subjected to JPEG encoding the present embodiment has shown that, the image data after enlarged or reduced may be subjected to another scheme such as MPEG encoding. Further, the JPEG encoder 13 may be replaced with another processing unit in which the input number of lines is restricted.

Moreover, the image processing apparatus 1 incorporated in the digital camera is described as the embodiment. However, the present invention can be applied to an image processing apparatus incorporated in another video image equipment, image recognition equipment and the like, or can be applied to an apparatus used independently.

What is claimed is:

1. An image processing apparatus comprising:
a transferring unit configured to transfer input units of image data, the input units of image data including plural lines;
a magnification change unit configured to carry out a magnification change processing to each input unit of the image data transferred by the transferring unit, wherein the magnification change unit comprises an enlargement processing unit configured to enlarge an input unit of image data transferred by the transferring unit, and a reduction processing unit which is connected to the enlargement processing unit in series and which is configured to reduce an input unit of image data output from the enlargement processing unit, and wherein the reduction processing unit comprises a first reduction processing unit and a second reduction processing unit, and the first reduction processing unit and the second reduction processing unit are connected in parallel to the enlargement processing unit;
a magnification setting unit configured to set a magnification of the magnification change unit;
a magnification control unit which, according to the magnification set by the magnification setting unit and a required reduction rate, controls setting of a combination of magnifications of the enlargement processing unit, the first reduction processing unit, and the second reduction processing unit, wherein different magnifications are set to the first reduction processing unit and the second reduction processing unit; and
an encoding unit configured to encode an input unit of the image data which was subjected to the magnification change processing by the magnification change unit, the encoding unit defining a number of lines of the input unit of the image data subjected to the magnification change processing;
wherein the magnification control unit controls setting of the combination of magnifications such that a number of lines included in the input unit of the image data transferred to the encoding unit equals the number of lines defined by the encoding unit.

2. The image processing apparatus according to claim 1, further comprising a storing unit configured to store image data encoded by the encoding unit.

3. The image processing apparatus according to claim 1, wherein the encoding unit encodes the image data according to JPEG standards.

4. The image processing apparatus according to claim 1, wherein the image data is raw image data composed of pixels of color information according to a color filter array formed on an image pickup device.

5. The image processing apparatus according to claim 1, wherein the image data comprises luminance and color difference data.

6. The image processing apparatus according to claim 1, further comprising a storing unit configured to store an image, and
wherein the transferring unit transfers the input unit of the image data of the image stored in the storing unit.

7. The image processing apparatus according to claim 6, wherein the storing unit stores raw image data composed of pixels of color information according to a color filter array formed on an image pickup device, and wherein the transferring unit comprises a first transfer unit configured to transfer input units of the raw image data stored in the storing unit, the input units of the raw image data including the plural lines,
the image processing apparatus further comprising a converting unit configured to convert the raw image data transferred by the first transfer unit to luminance and color difference data, and
wherein the magnification change unit carries out the magnification change processing to the luminance and color difference data output from the converting unit.

8. The image processing apparatus according to claim 7, wherein the converting unit converts an input unit of the raw image data transferred by the first transfer unit to luminance and color difference data composed of pixels in a predetermined pixel range contained in the input unit of the raw image data.

9. The image processing apparatus according to claim 7, wherein the storing unit is configured to store luminance and color difference data and wherein the transferring unit comprises a second transfer unit configured to transfer input units of the luminance and color difference data stored in the storing unit, the input units of the luminance and color difference data including the plural lines,
the image processing apparatus further comprising a selecting unit configured to select one of the luminance and color difference data output from the converting unit, and the luminance and color difference data transferred by the second transfer unit, and
wherein the magnification change unit carries out the magnification change processing to the luminance and color difference data selected by the selecting unit.

10. The image processing apparatus according to claim 7, wherein the raw image data comprises Bayer data.

11. The image processing apparatus according to claim 7, wherein the storing unit stores luminance and color difference data, and the transferring unit transfers input units of the luminance and color difference data stored in the storing unit, the input units of the luminance and color difference data including the plural lines.

12. The image processing apparatus according to claim 1, wherein a succeeding input unit of the image data includes bottom line or lines of a preceding input unit of the image data as a top line or lines thereof.

13. The image processing apparatus according to claim 1, wherein the enlargement processing unit enlarges the image data based on a first image processing algorithm and the first and the second reduction processing units reduce the image data output from the enlargement processing unit based on a second image processing algorithm.

14. The image processing apparatus according to claim 1, wherein the first reduction processing unit outputs the image data after the magnification change processing to the encoding unit.

15. The image processing apparatus according to claim 1, wherein the second reduction processing unit outputs the image data after reduction to a storing unit which stores the image data.

16. An image processing apparatus comprising:
means for transferring input units of image data, the input units of image data including plural lines;
magnification change means for carrying out a magnification change processing to each input unit of the image data transferred by the transferring means, wherein the magnification change means comprises enlargement processing means for enlarging an input unit of image data transferred by the transferring means, and reduction processing means, connected to the enlargement processing means in series, for reducing the input unit of image data output from the enlargement processing means, and wherein the reduction processing means comprises a first reduction processing unit and a second reduction processing unit, and the first reduction processing unit and the second reduction processing unit are connected in parallel to the enlargement processing means;
magnification setting means for setting a magnification of the magnification change means;
magnification control means for, according to the magnification set by the magnification setting means and a required reduction rate, controlling setting of a combination of magnifications of the enlargement processing means, the first reduction processing unit, and the second reduction processing unit, wherein different magnifications are set to the first reduction processing unit and the second reduction processing unit; and
encoding means for encoding an input unit of the image data which was subjected to the magnification change processing by the magnification change means, the encoding means defining a number of lines of the input unit of the image data subjected to the magnification change processing;
wherein the magnification control means controls setting of the combination of magnifications such that a number of lines included in the input unit of the image data transferred to the encoding means equals the number of lines defined by the encoding means.

17. An image processing method which is carried out using a processor, comprising:
transferring input units of image data, the input units of image data including plural lines;
setting a magnification of a magnification change processing;
carrying out the magnification change processing to each transferred input unit of the image data by enlarging a transferred input unit of the image data and then reducing the enlarged input unit of the image data, wherein the enlargement is performed by an enlargement processing unit and the reduction is performed by a reduction processing unit which is connected to the enlargement processing unit in series and which comprises a first reduction processing unit and a second reduction processing unit, the first reduction processing unit and the second reduction processing unit being connected in parallel to the enlargement processing unit, wherein a combination of magnifications set to the enlargement processing unit, the first reduction processing unit and the second reduction processing unit is controlled according to the set magnification of the magnification change processing and a required reduction rate, and wherein different magnifications are set to the first reduction processing unit and the second reduction processing unit; and
encoding an input unit of the image data which was subjected to the magnification change processing, the encoding defining a number of lines of the input unit of the image data subjected to the magnification change processing;
wherein the setting of the combination of magnifications is controlled such that a number of lines included in the input unit of the image data transferred for the encoding equals the defined number of lines of the input unit of the image data subjected to the magnification change processing.

18. A computer readable recording medium having stored thereon a program for controlling an image processing apparatus to perform functions comprising:
transferring input units of image data, the input units of image data including plural lines;
setting a magnification of a magnification change processing;
carrying out the magnification change processing to each transferred input unit of the image data by enlarging a transferred input unit of the image data and then reducing the enlarged input unit of the image data, wherein the enlargement is performed by an enlargement processing unit and the reduction is performed by a reduction processing unit which is connected to the enlargement processing unit in series and which comprises a first reduction processing unit and a second reduction processing unit, the first reduction processing unit and the second reduction processing unit being connected in parallel to the enlargement processing unit, wherein a combination of magnifications set to the enlargement processing unit, the first reduction processing unit and the second reduction processing unit is controlled according to the set magnification of the magnification change processing and is based on a required reduction rate, and wherein different magnifications are set to the first reduction processing unit and the second reduction processing unit; and
encoding an input unit of the image data which was subjected to the magnification change processing, the encoding defining a number of lines of the input unit of the image data subjected to the magnification change processing;
wherein the setting of the combination of magnifications is controlled such that a number of lines included in the input unit of the image data transferred for the encoding equals the defined number of lines of the input unit of the image data subjected to the magnification change processing.

* * * * *